United States Patent [19]
Hibbs-Brenner et al.

[11] Patent Number: 6,069,991
[45] Date of Patent: *May 30, 2000

[54] FLEXIBLE OPTIC CONNECTOR ASSEMBLY

[75] Inventors: Mary K. Hibbs-Brenner, Plymouth, Minn.; Harold Y. Walker, Jr., Plano, Tex.

[73] Assignee: Honeywell International Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/134,229

[22] Filed: Aug. 14, 1998

Related U.S. Application Data

[62] Division of application No. 08/775,330, Dec. 31, 1996.

[51] Int. Cl.[7] .................................................. G02B 6/26
[52] U.S. Cl. ................................................ 385/50; 385/52
[58] Field of Search ................................. 385/49, 50, 51, 385/52, 63

[56] References Cited

U.S. PATENT DOCUMENTS

| | | | |
|---|---|---|---|
| 4,962,991 | 10/1990 | Carvalho | 385/56 |
| 5,414,786 | 5/1995 | Ohta et al. | 385/63 |
| 5,596,662 | 1/1997 | Boscher | 385/50 |
| 5,706,378 | 1/1998 | Suzuki et al. | 385/49 |
| 5,790,731 | 8/1998 | Deveau | 385/50 |

*Primary Examiner*—Hemang Sanghavi
*Attorney, Agent, or Firm*—John G. Shudy, Jr.

[57] ABSTRACT

A self-aligned optical coupler for connecting an optical waveguide circuit with another optical waveguide circuit. Each waveguide circuit has a plug with an aligned structure. The plugs of the respective waveguide circuits are inserted into a receptacle having alignment structures. The alignment structures of the first and second plugs are mated in such a fashion with the receptacle so that there is optical alignment between the plugs so that optical signals can propagate from one waveguide to another. The structures may attain alignment through physical or visual approaches.

3 Claims, 24 Drawing Sheets

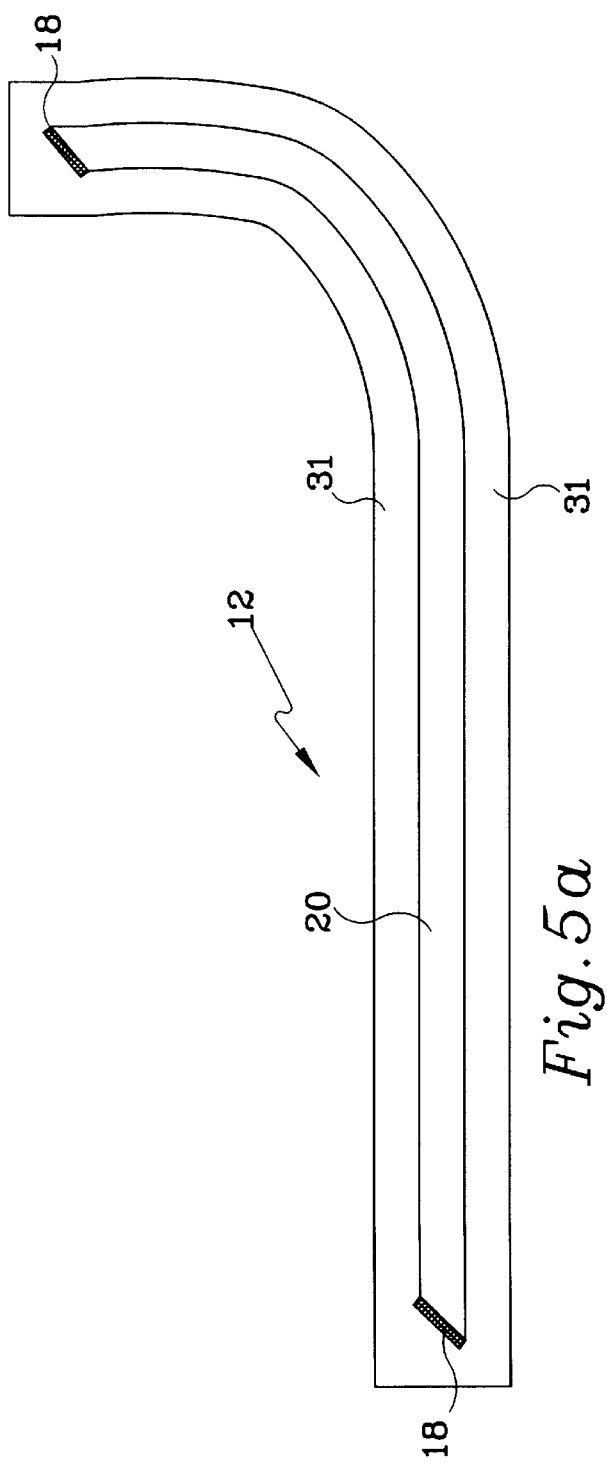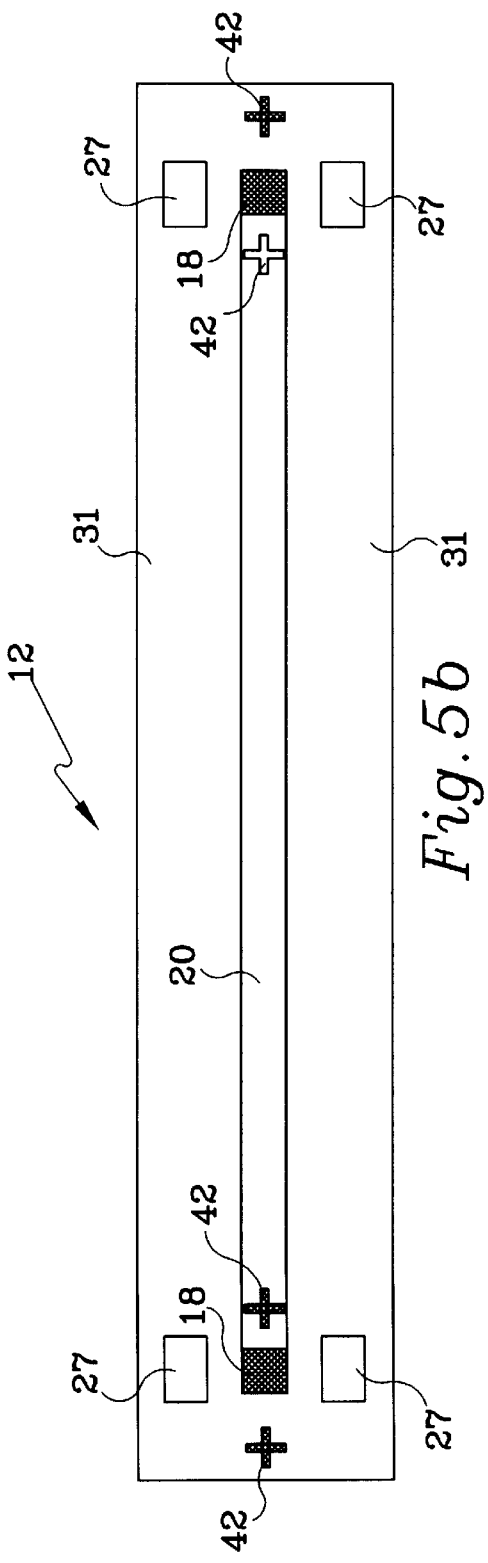

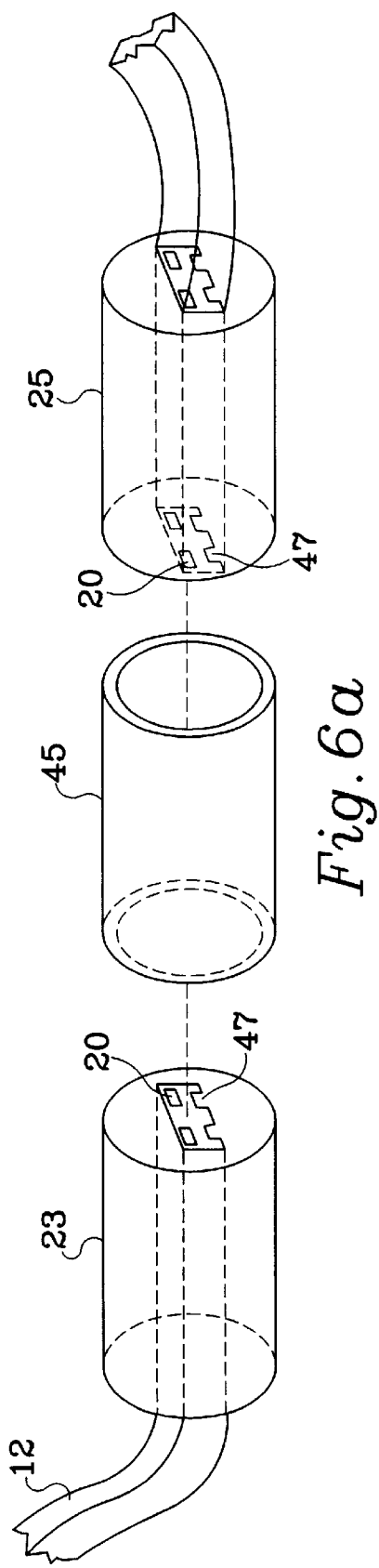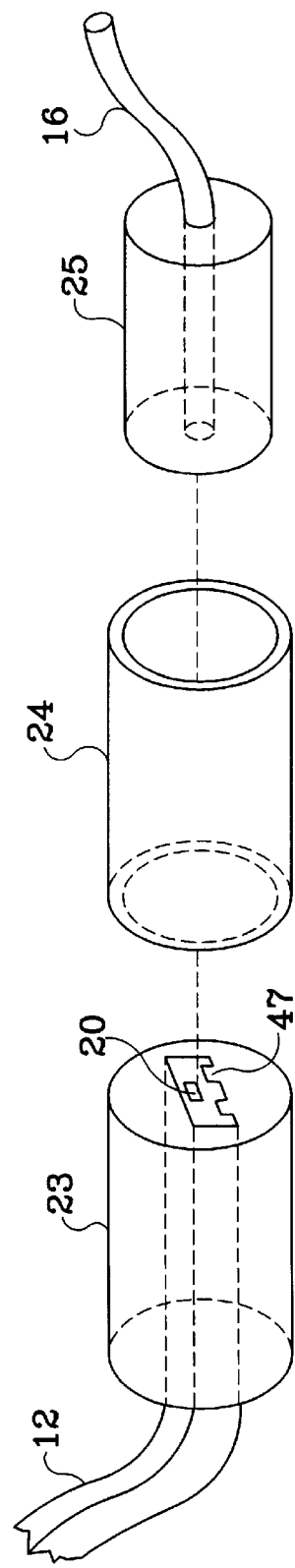

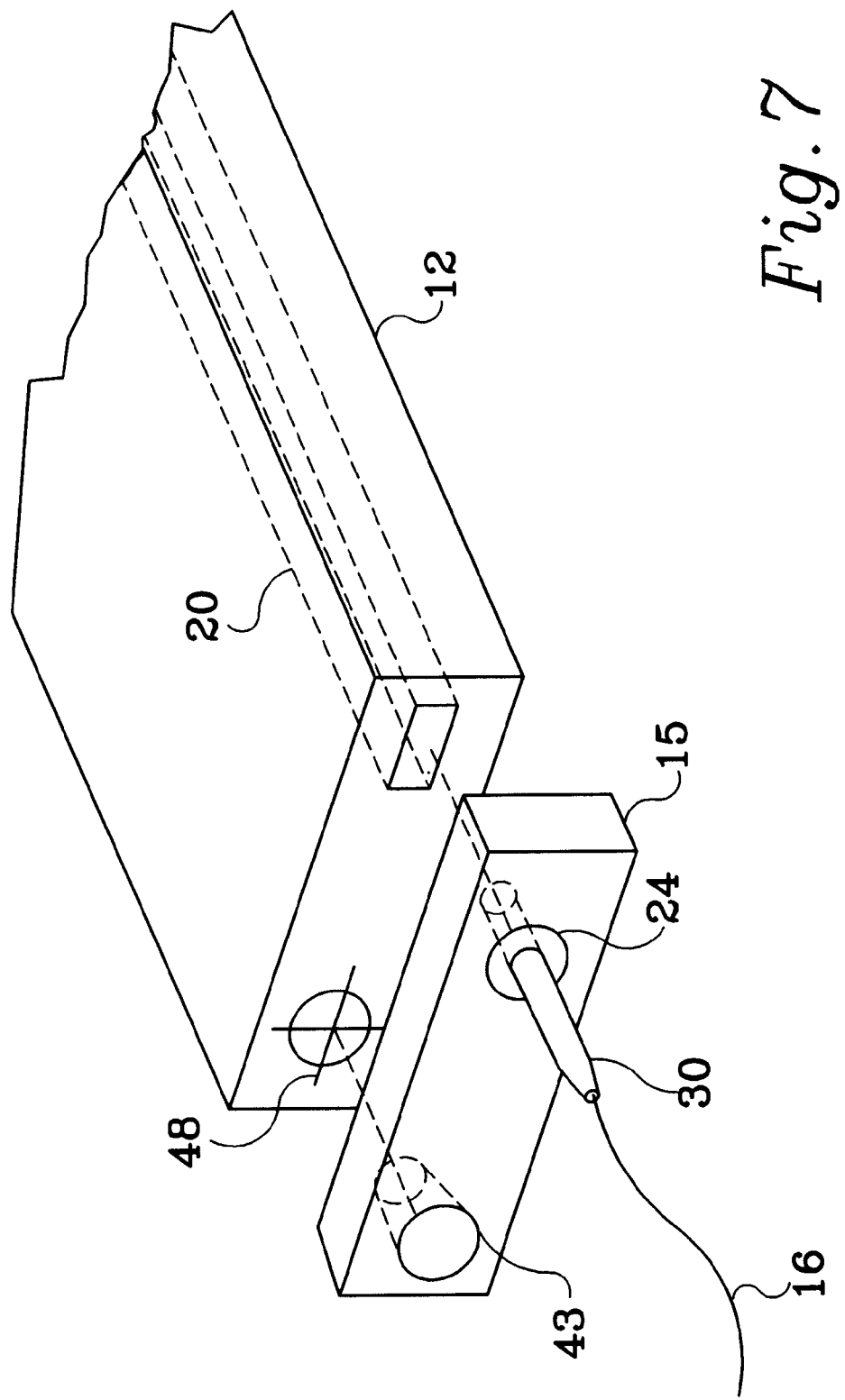

FLEXIBLE OPTIC CONNECTOR ASSEMBLY

This application is a divisional of copending application Ser. No. 08/775,330, filed on Dec. 31, 1996, pending. The U.S. Government may have rights in the present invention.

BACKGROUND OF THE INVENTION

The invention pertains to optical connectors and particularly to optical connectors making use of flexible waveguides. More particularly, this invention pertains to the use of self-aligned, flexible optical waveguides for coupling light between an optoelectronic device and an optical fiber or waveguide or arrays of devices and fibers or waveguides.

A common problem is to simultaneously provide electrical connection to an optoelectronic device as well as optical coupling from the device to an optical fiber in a connectorized package. Previous methods of such coupling have included placing the device in a first level package such as TO header into an optical connector receptacle, rather than directly on the circuit board and to provide electrical connection from the circuit board to the TO header by means of an electrical flex circuit. This approach involves costly and time consuming methods of manufacturing.

This invention has three parts: 1) the flexible optical medium guiding the light from an optical device to a connector receptacle; 2) the approach for coupling the light from the device to the flexible optical medium; and 3) the approach for coupling light from the flexible medium to the fiber or waveguide within the connector receptacle.

U.S. Pat. No. 5,375,184 ('184 patent) by inventor Charles T. Sullivan and issued Dec. 20, 1994, which is hereby incorporated by reference in this specification and discloses 1) self-aligning mechanical approach for lateral waveguide to lateral waveguide alignment and 2) the use of visual alignment marks for lateral waveguide to lateral waveguide alignment or the alignment of a vertical port to a waveguide with a 45 degree facet. The visual alignment marks of the '184 patent for use with a vertically coupled optical port still require manual alignment which is not self-aligning. Also that patent does not deal with 3), i.e., the approach for coupling between a flexible optical waveguide and an optical fiber waveguide within the connector receptacle.

SUMMARY OF THE INVENTION

The present invention has self-aligning features for waveguide self-alignment to a vertically coupled optical port such as a photodetector, VCSEL, or surface emitting LED. The invention also includes self-aligning or passively aligned structures for connector receptacles and backplanes. While the optical devices or optoelectronic integrated circuits are still at the wafer level, the wafer is coated and photolithographically patterned to provide the self-aligning features. Specifically, a pillar of dielectric or polymer material on the photodetector or laser wafer is fabricated in a fashion such that it fits or snaps into a recess of the waveguide thus providing a passive alignment with an accuracy of better than 5 micrometers ($\mu$m). The added feature of this is the holding of the waveguide in place after the aligning fixtures are removed.

The features of the present invention include a self-aligning approach for coupling a waveguide or a plurality of waveguides to a vertically coupled device or devices, which can then be mounted directly onto a circuit board with other chips, without a first level package, and for connecting of the other ends of the waveguides or connectors into optical connector receptacles of a module or a backplane.

The features of this approach include an optical waveguide or array of waveguides, that optically connect an optical device or devices at one end to a connector/connector receptacle at the other end. Self-aligning mechanical features provide 1 to 5 $\mu$m alignment tolerances at the optical chip, while mechanical or visual alignment marks allow accurate placement of the waveguide in the connector receptacle at the other end, allowing automatic alignment to take place with machine vision.

BRIEF DESCRIPTION OF THE DRAWING

FIGS. 5a and 5b reveals the structure of the flexible waveguide having two forty-five degree facet ends.

FIGS. 6a, 6b, 6c, 6d, 6e and 6f illustrate various connections of two flexible light waveguides/fibers.

FIG. 7 illustrates an alternative approach for aligning the waveguide/structure at the connector receptacle end.

DESCRIPTION OF THE SPECIFIC EMBODIMENTS

Figure 1A:
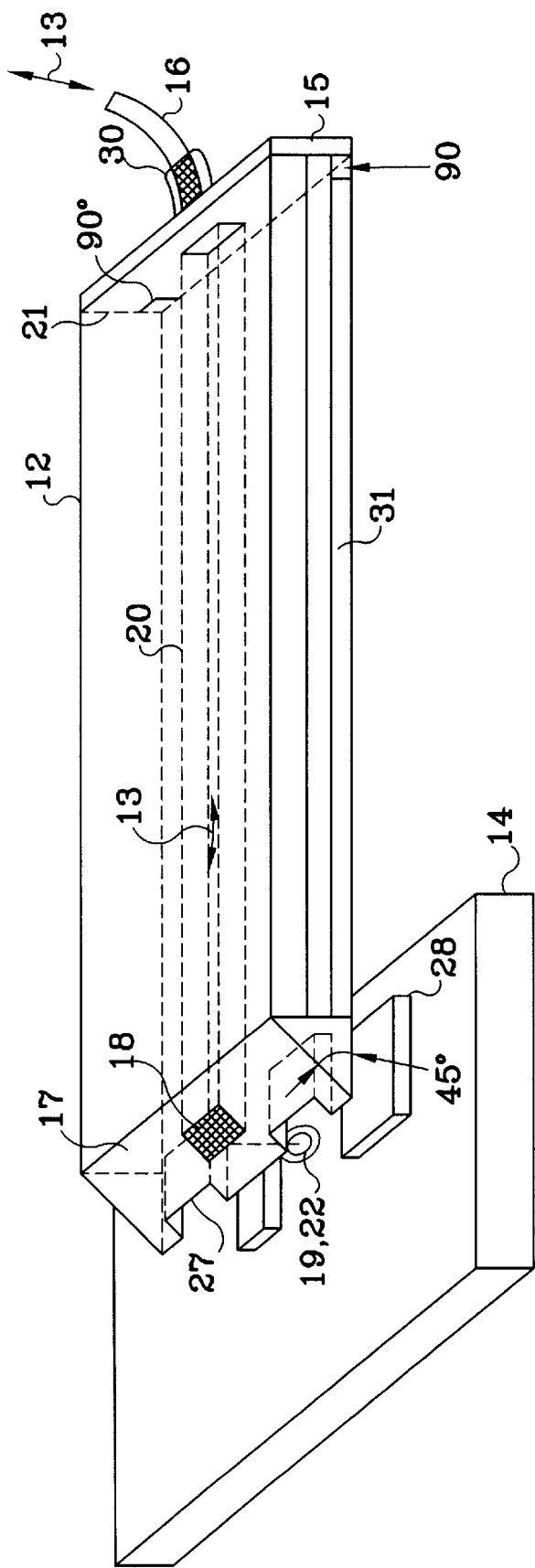
FIGS. 1a and 1b illustrate a self-alignment mechanism between a flexible coupler and a circuit board having a vertical light port.

A polymer waveguide structure 12 (FIG. 1a) is used to guide light 13 to/from optical chip 14 through flexible optical circuit 12 and connector receptacle 15 and into fiber 16 which is centered with respect to connector receptacle 15 by ferrule 30. Flex circuit 12 containing waveguide 20 can be constructed from a variety of materials. One example is an ULTEM defined 12 waveguide circuit 12 with BCB cladding polymer layers 31. A two dimensional sheet of waveguide flex circuit structures can be fabricated, and then the individual flex circuits 12 may be separated by sawing or cutting. In the embodiment shown in FIG. 1a, a perpendicular cut 21 at one end is used where waveguide 12 couples to fiber 16 via connector receptacle 15 and ferrule 30. At the other end of the optical flex circuit 12, a 45-degree cut 17 is made to form a turning mirror 18 to direct light out of laser 19 and into waveguide 20, or out of waveguide 20 and into a photodetector 22.

Figure 1B:
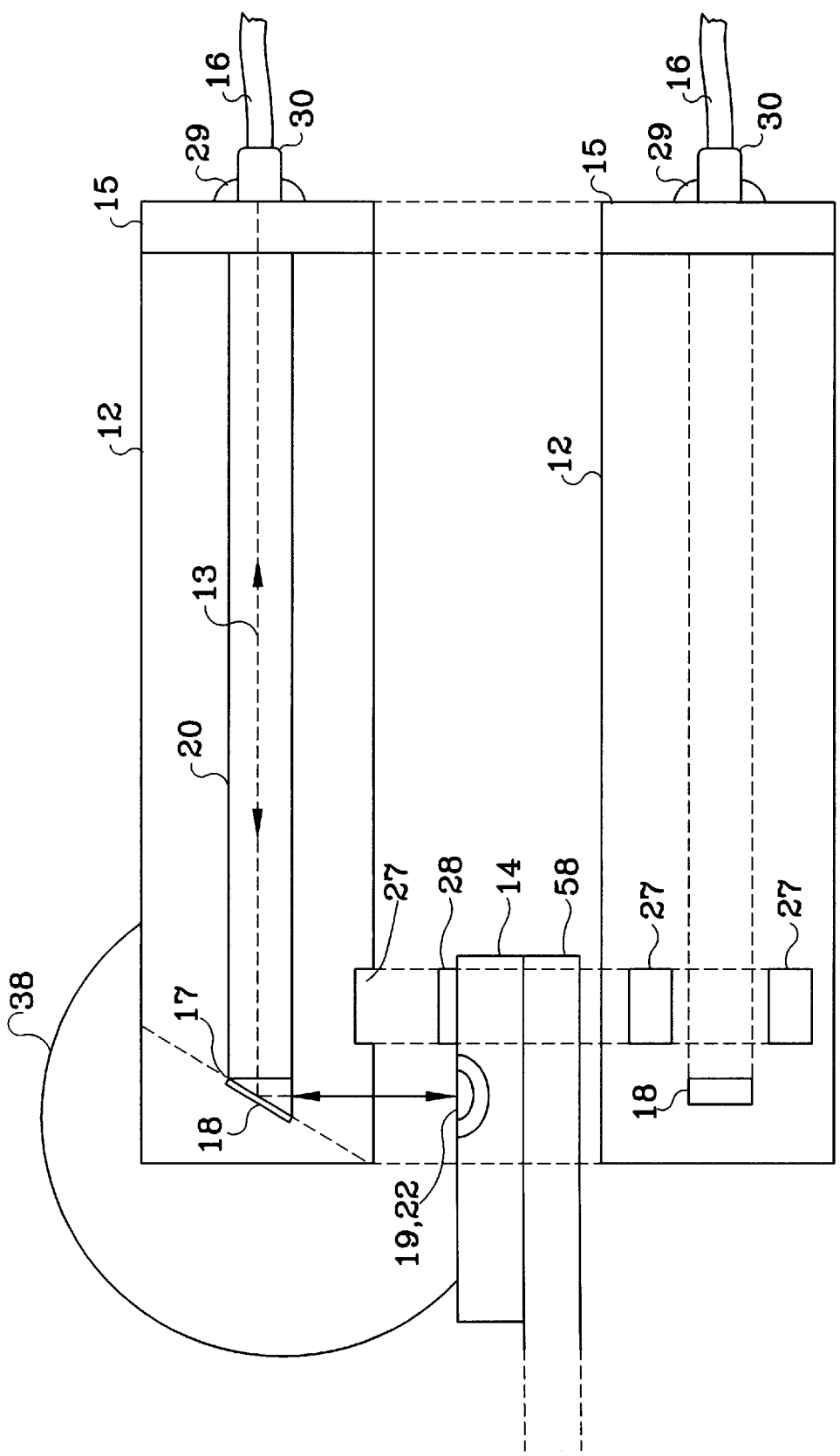

The present invention adapts the self-aligning waveguide technology to enable an optical chip 14 on-board packaging approach for modules and backplanes. An optical chip 14 containing a light source 19 or detector 22, can be placed directly on a board 58, with the light coupled in or out of the port 19, 22, through waveguide 20, as noted in FIG. 1b. Although not shown in the figure, this board 58 would also contain laser driver or receiver amplification I.C.s as discrete components. The use of a metalized 45-degree reflector 18 (in FIG. 1a) then allows device 12 to be covered with glob top 38 (a covering of protective dark epoxy) without affecting the optical properties. The other end of waveguide 20 is coupled into a connector receptacle 15 which accepts a ferrule 30 containing a fiber 16 which fits with precision inside receptacle 15, and, as a result, is precisely aligned to waveguide 20. There is a connector receptacle 15 holding onto both device 12 and fiber ferrule 30. The same approach described here can be used to couple two waveguides together at a board to backplane interface, for instance, as shown in FIG. 2b.

Figure 2A:
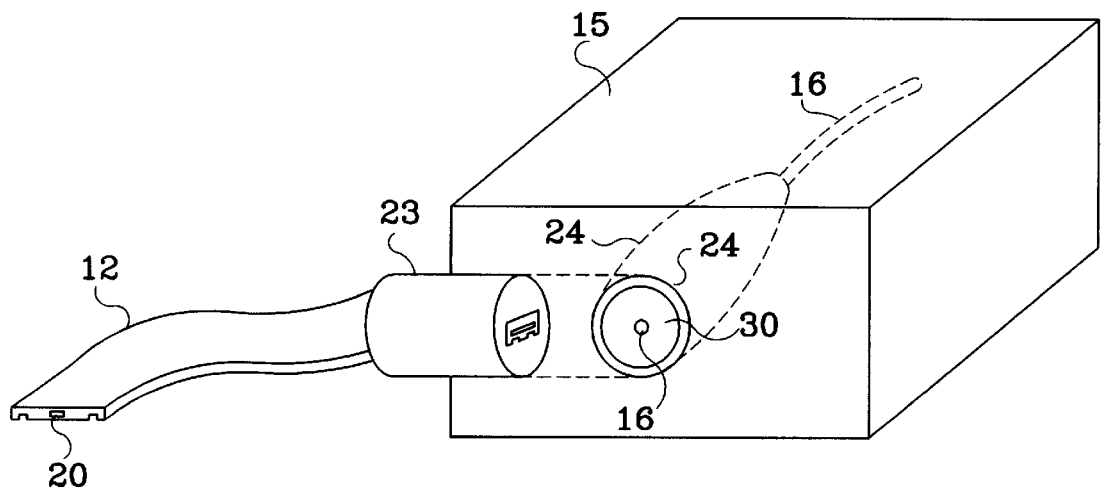
FIGS. 2a and 2b show a plug and receptacle connection of flexible couplers.
Figure 2B:
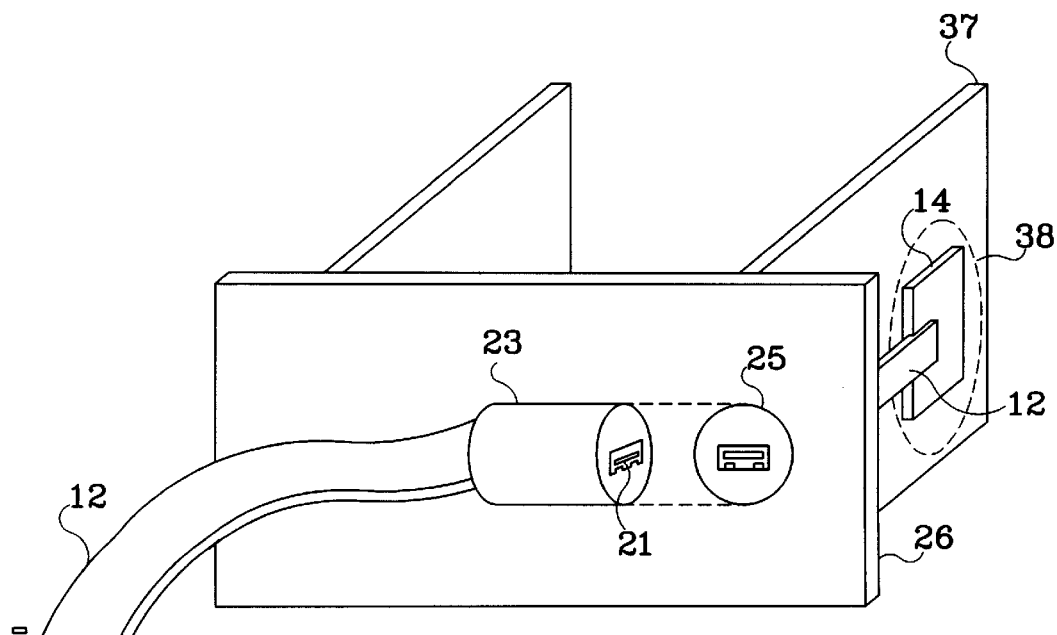

FIG. 2a shows the parallel waveguide flexible connector/interface 12 used to provide a rugged interface between a package or multichip module containing an optoelectronic die, and a connectorized optical fiber 16 which provides an interconnect path to the next module, board, or cabinet, via connector receptacle 23, connector 24 and ferrule 30.

Figure 3A:
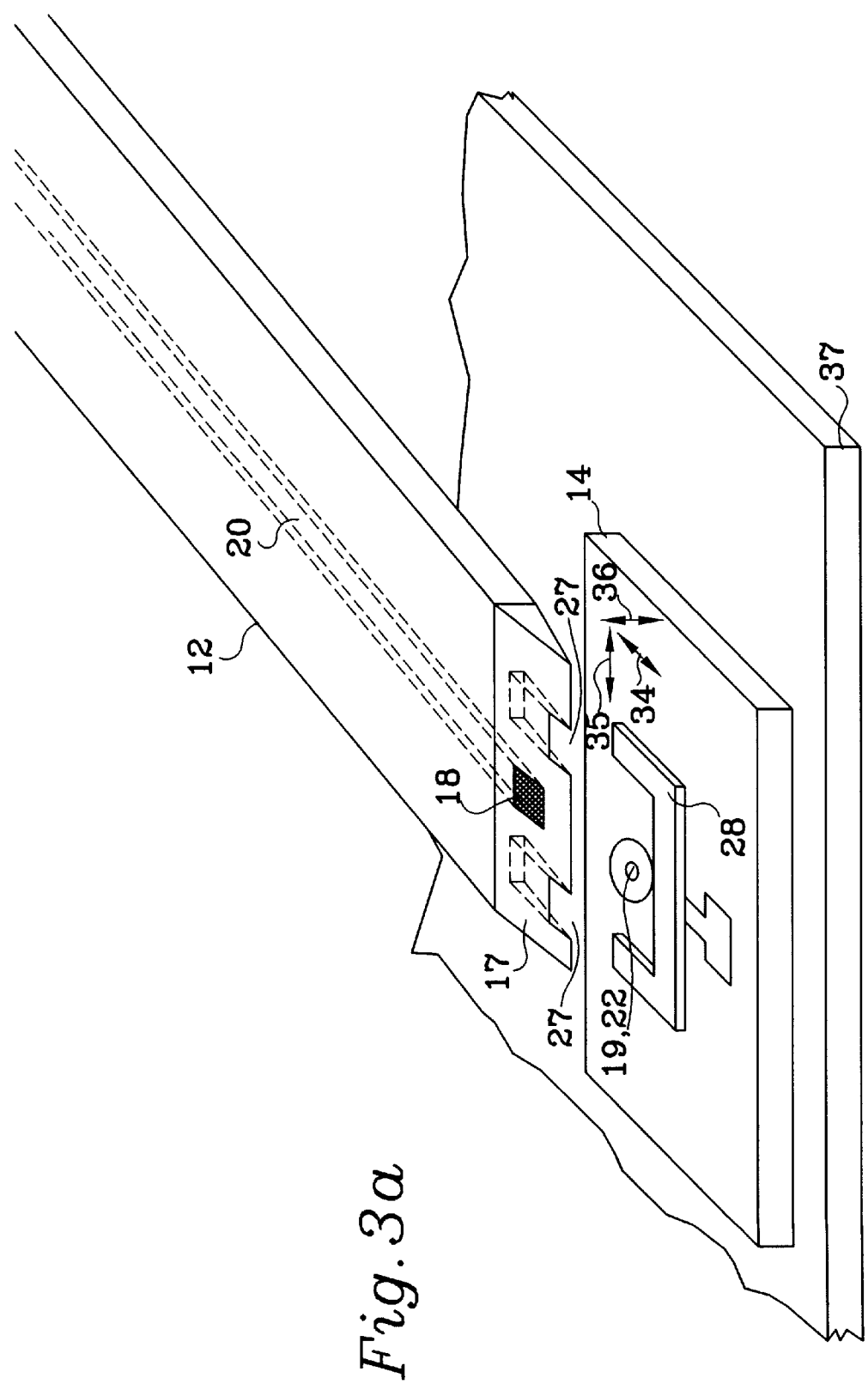
FIGS. 3a and 3b illustrate alignment grooves and ridges of a flexible-coupler-to-board connection.
Figure 3B:
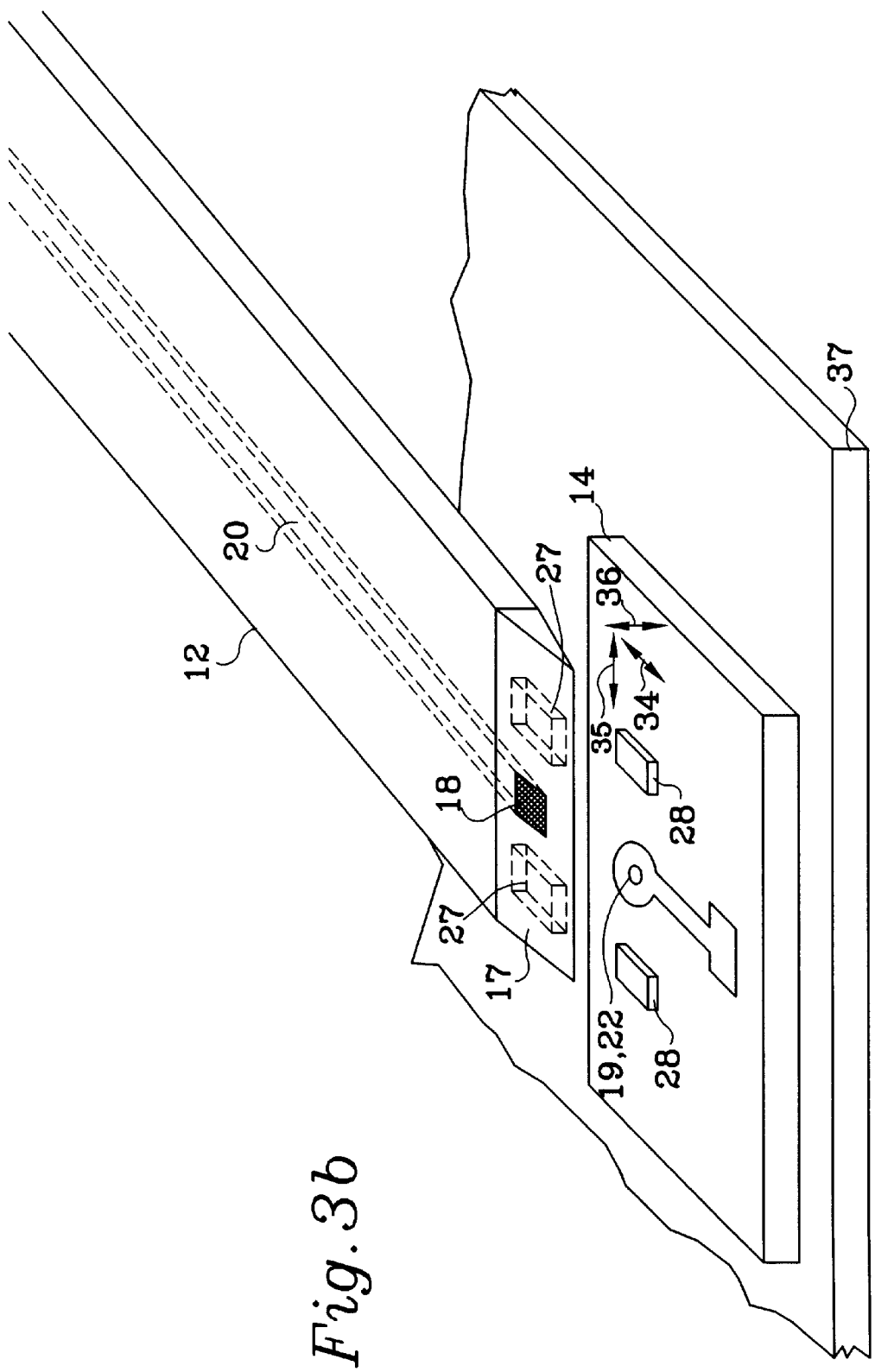

In order to passively align optical flex circuit 12 to an optical chip 14, locking structures 27 and 28 are defined in both optical flex circuit 12 and on top of optical chip 14, respectively. FIGS. 1a and 1b show examples of waveguide-to-chip passive mechanical alignments. Grooves 27 are etched into optical flex circuit 12 as illustrated in FIGS. 3a and 3b. A matching alignment ridge 28 is formed on the surface near laser 19 or photodetector 22 on chip 14, by depositing and patterning an additional thick polymer layer on the surface of the chip. The polymer optical flex circuit contains both waveguide 20 for guiding the optical signal, and alignment wells 27. End 17 of optical flex circuit 12 which is coupled to the optical chip 14 is cut or sawed at a 45-degree angle 17. Alignment wells 27 in the optical flex circuit 12 are then snapped into place on top of ridges 28 on the laser 19 or photodetector 22 chip. This can be designed as two tracks so that the optical flex circuit 12 can be slid over chip 14 until turning mirror 18 is properly placed over optical device 19 such as a VCSEL. Ridges 28 and slots 27 provide alignment in lateral directions 34 and 35. The top surface of chip 14 and the bottom surface of flex circuit 12 provide alignment in vertical direction 36.

Alignment ridges 28 can be photolithographically defined at the wafer level during fabrication of lasers 19 and photodetectors/receivers 22, so that the fabrication can be very cost effective. Optical flex circuit 12 is multiply fabricated in large sheets, and then sawed into individual circuits 12 (with both 90-degree 21 and 45-degree 17 facets for mirrors 18), respectively, much as one saws up a wafer in the art. The fabrication of optical flex circuit 12 uses integrated circuit (IC) type manufacturing processes. The surface of 45-degree turning mirror 18 on optical flex circuit 12 is coated with gold or gold-titanium so that the reflectivity of turning mirror 18 is insensitive to the refractive index of the medium placed in contact with this mirror.

Similar self-aligning structures 27 are fabricated in optical flex circuit 12 to match alignment structures 28 in connector receptacle 15, so that flex circuit 12 is passively aligned for coupling from waveguides 20 to fibers 16 or other waveguides 20 in flex circuits 12 plugged into connector receptacle 15, 24 or 25. This is illustrated in FIGS. 1a, 1b, 2a and 2b.

The assembly of the optical components onto a printed circuit board 37 includes optical chips 14 being mounted onto board 37 using standard pick and place and surface mount techniques (FIG. 2b). For example, in current manufacturing processes, board 37 is stenciled with epoxy, chips 14 are placed on board 37, and an anneal step fastens the chips to board 37. The sheet of optical flex circuits 12 is cut into individual pieces, in one embodiment, each with a 90-degree facet 21 and a 45-degree facet 17 or with two 45-degree facets 17. Part of the 45-degree facets 17 are all metalized into mirrors 18 in a single batch metallization step. Optical flex circuit 12 can then be snapped onto the optical chips 14 and slid into place so 45-degree facet 17 with mirror 18 is properly located over the top of vertical port optical devices 19 and 22 on chip 14. The other end 21 of the optical flex circuit 12 having slots 27 may be slotted or threaded for sliding into connector receptacle 15 having ribs 28. This provides alignment to a fiber in a mating ferrule 30, or to another waveguide in a mating ferrule 25 in FIG. 2b.

Electrical wire bonding is performed to the optical chips 14 as well as the other I.C.s on board 37, and then an encapsulation step can be carried out such as depositing a "glob top" or dark epoxy covering 38 (in FIG. 2b) over all the chips 14. Since waveguide 12 turning mirror 18 is metalized, the use of glob top 38 provides mechanical and moisture protection for chips 14, without affecting the coupling efficiency from optical devices 19 and 22 to optical flex circuit 12 (illustrated in more detail in FIGS. 1a, 1b, 3a and 3b).

Features of the self-aligning interface are simple fabrication, no critical alignment steps required, no special training needed for optical component assembly because of self-aligning parts, low optical waveguide connection loss (i.e., 0.6 dB), permanent or temporary integration with an appropriate adhesive, and versatility wherein the self-aligning interface can be used to connect polymer waveguides 12 or optical fibers 16 to optoelectronic devices 19 and 22 packaged within multichip modules, hybrids, conventional packages or chip-on-board technology.

This description builds on the above-noted items to implement a chip-on-board connector. The invention includes a method for packaging either a serial or parallel optoelectronic module with optical chips 14, i.e., having laser 19 and photodetector/receiver 22 devices, mounted directly on printed circuit board 37. The method is for coupling light out of the laser 19, through a connector receptacle 24 and plug 23 and into fiber 16, as well as from fiber 16 into the photodetector/receiver 22.

This invention extends an adaptation for passive alignment to optical chips 14. This invention allows the optical chips 14 to be placed on the printed circuit board 37 rather than in first level packages such as TO headers. This approach provides both cost and speed advantages. Speed advantages occur because one can eliminate the leads from the package, such as those one typically finds in TO headers. These leads give rise to resonances which limit the ultimate package speed. This limit is around one gigahertz (GHz) for a TO 5.6 millimeter (mm) package. The flexible waveguide self-aligning interconnection also provides cost advantages by eliminating the first level package, allowing the optical chips 14 to be attached to board 37 at the same time as all the other I.C.s, and eliminating the need for an active optical alignment and soldering of a TO header with respect to the connector receptacle 24.

Figure 4:
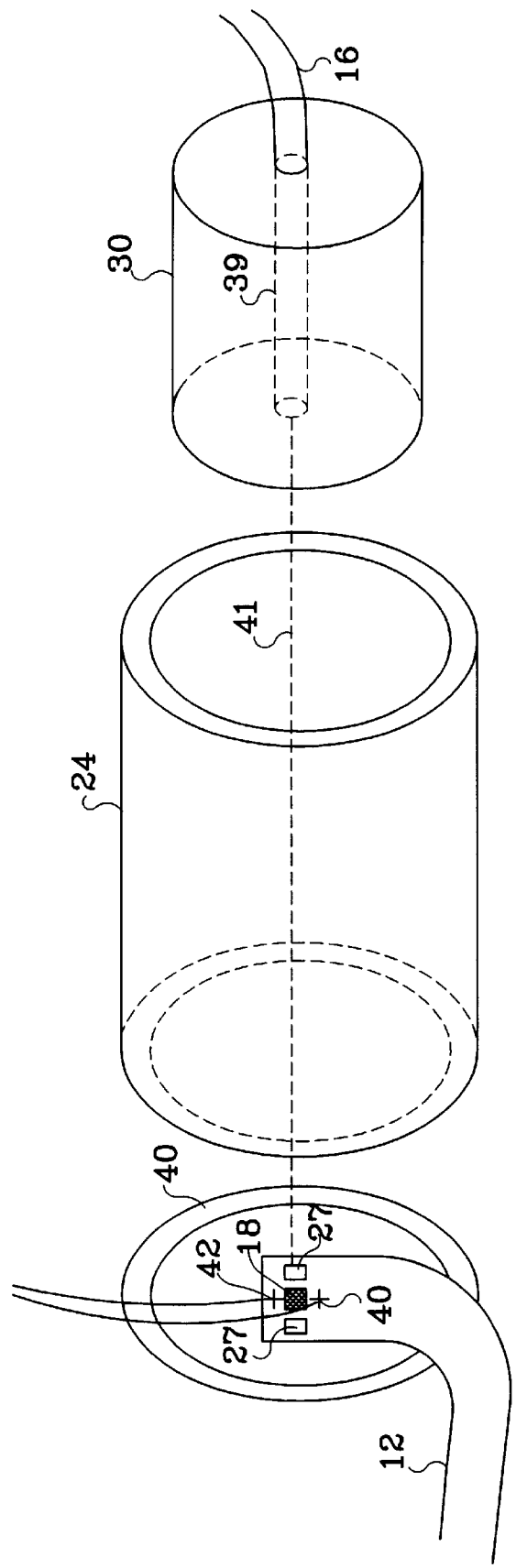
FIG. 4 shows an approach using visual alignment marks for positioning a flexible waveguide in an optical fiber connector receptacle.

FIG. 4 shows another embodiment for the connector which provides a sleeve type connection between flex circuit 12 and fiber 16. Fiber 16 is inserted with a hole 39 which may be slightly tapered with the larger diameter at the end where the fiber is inserted so as to ease the insertion of fiber 16 into hole 39. As fiber 16 is inserted the tapering of hole 39 this causes fiber 16 to enter into a tight fit in hole 39 as it approaches the other end of ferrule 30. An epoxy may be applied at the end where fiber 16 enters hole 39 on ferrule 30 to secure fiber 16 to ferrule 30. Ferrule 30 is fit into sleeve or connector receptacle 24 to where the ends of fiber 16 and ferrule 30 are at the other end of sleeve or connector receptacle 24. The end with 45-degree mirror 18 of flex circuit 12 is attached to a piece 40 that fits on the end of sleeve 24 like a cap. The metalized 45-degree facet mirror 18 is centered on the receptacle 24 center so it is aligned with the end of fiber 16 along axis or alignment line 41. Alignment grooves or slots 27 are not used at that end. Alignment marks 42 allow for manual or machine vision alignment of mirror 18 with the center of receptacle 24 and thus to the end of fiber 16.

FIGS. 5a and 5b show plane and lateral views of flex circuit 12 for the embodiment having 45-degree facets for mirror 18 on both ends. An ULTEM waveguide is enclosed by BCB clads 31. At both ends are visual alignment marks 42 used for aligning mirrors 18 to other optical devices 19 or 22, waveguides 20, mirrors 18 or fibers 16.

Figure 6C:
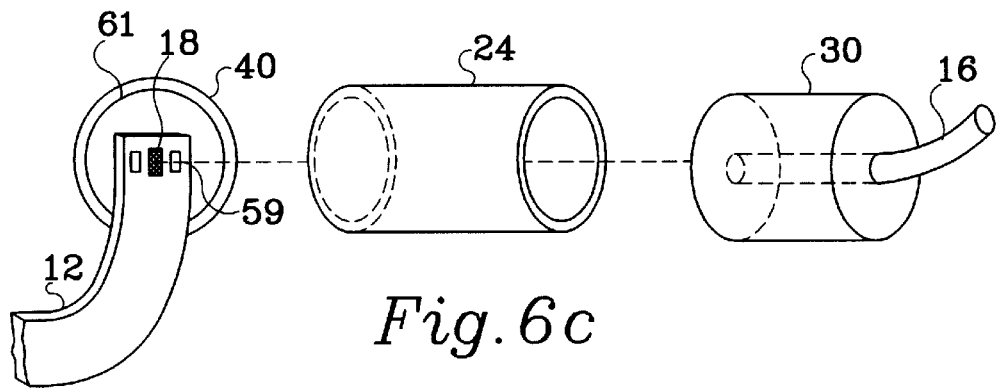
Figure 6D:
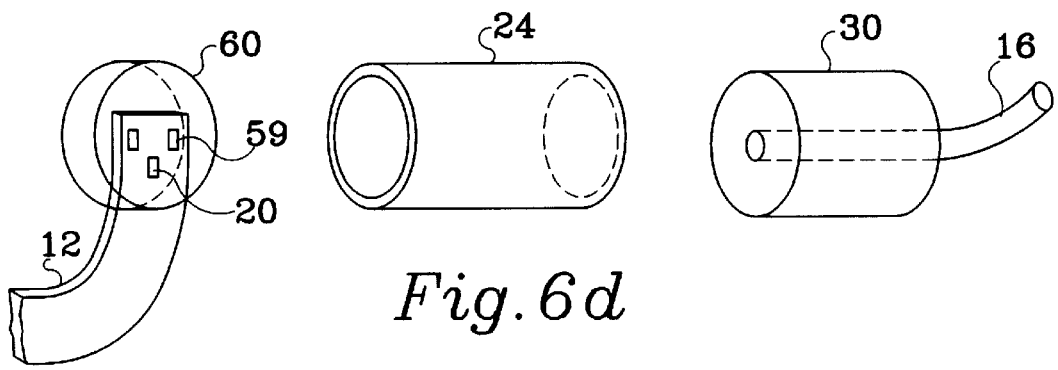
Figure 6E:
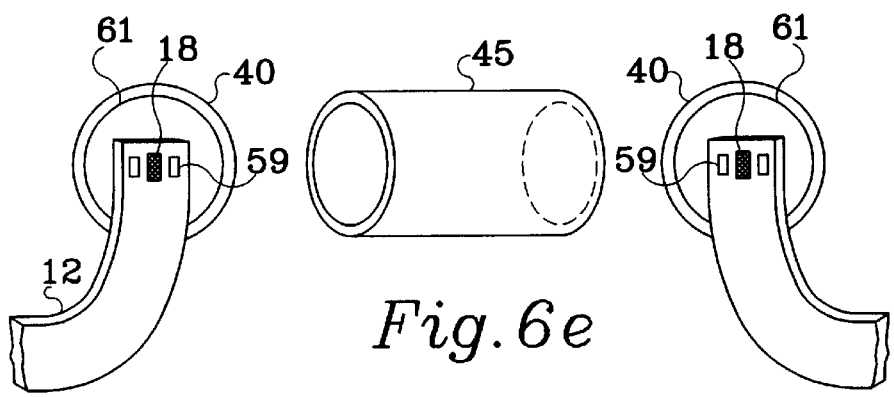
Figure 6F:
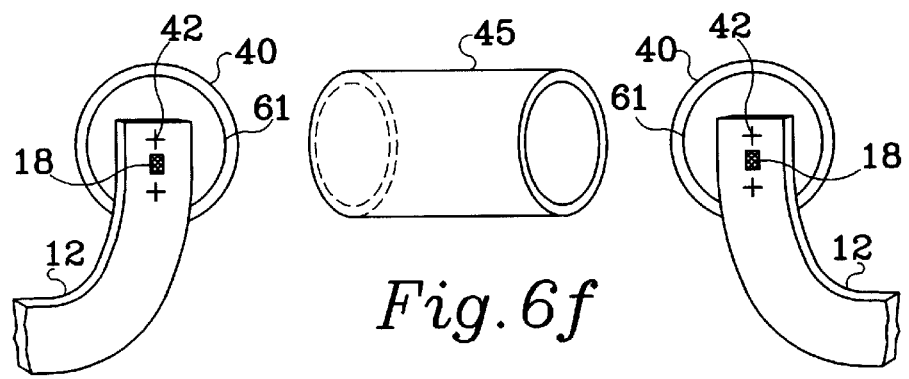

In FIGS. 6a through 6f, connections of various combinations of flexible waveguides and/or optical fibers, having optical or mechanical alignment, are illustrated. In FIGS. 6a, 6e and 6f, a flex waveguide circuit 12 may be attached to another flex waveguide circuit 12 via receptacle 25 and sleeve 45. In FIG. 6a, alignment slots or keys 47 are at the ends of plug 23 and receptacle 25. Plug 23 and receptacle 25 fit into sleeve 45 and are self-aligned with mechanical slots and keys 47, respectively.

FIG. 6b shows a waveguide 12 in plug 20 which is optically connected to an optical fiber 16 in receptacle 25. Waveguide 12 and fiber 16 are brought into optical alignment when plug 23 and receptacle 25 are inserted into sleeve 24 and to be proximate to each other.

FIG. 6c shows flex circuit 12 having waveguide 20 aligned mechanically to plate 40 via depressions 59 on circuit 20 which are mechanically aligned to pillars on plate 40. Edge 61 of plate 40 is mechanically aligned with the inside diameter sleeve 45. Plate 40 fits on sleeve 24 and ferrule 30 having fiber 16, is slipped into sleeve 24 and the end of fiber 16 is optically aligned with mirror 18 which reflects light to or from waveguide 20 in flex circuit 12. FIG. 6d shows flex circuit 12 having a lens 60. The depressions of circuit 12 are mechanically aligned with pillars on lens 60. Lens 60 is mechanically aligned and fitted to the inside diameter of sleeve 24. Ferrule 30 with fiber 16 is likewise mechanically aligned and fitted to the inside diameter of sleeve 24, thus resulting in the optical alignment of fiber 16 with waveguide 20 of the flex circuit 12.

FIG. 6e shows flex circuit 12 aligned with and attached to plate 40 like that in FIG. 6c. This flex circuit 12 is optically connected to another flex circuit 12 which is similarly aligned with and attached to a plate 40. The plates are attached to the respective ends of sleeve 45 whose inside diameter is mechanically aligned to edges 61 of plates 40, respectively, resulting in optical alignment of mirrors 18 of waveguides 20 of flex circuits 12. FIG. 6f reveals a similar interconnection of flex circuits 12 except instead of mechanical alignment of pillars and depressions 59 of circuit 12 to pillars on plate 40, there are visual alignment marks 42 which allow for either manual or machine vision alignment of flex circuit 12 to plate 40 such that when plates 40 are attached to sleeve 45, mirrors 18 will be optically aligned with each other.

FIG. 7 shows an interface device 15 for connecting fiber 16 to waveguide 20 of flex circuit 12. Fiber 16 is fit into ferrule 30. Ferrule 30 fits into receptacle 24 which is inserted into device 15. The end of fiber 16 is approximately flush with the surface of device 15 which mates with the 90-degree facet 21 of circuit 12. A hole 43 in device 15 and alignment marks or cross-hairs 48 on 90-degree facet 21 permit manual or machine vision alignment of the end of fiber 16 in device 15 with waveguide 20 of circuit 12 so that light can efficiently propagate between fiber 16 and waveguide 20.

Figure 8A:
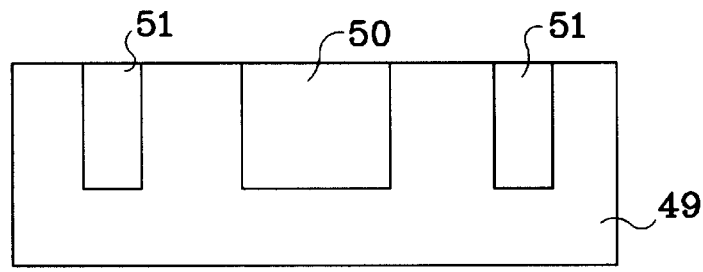
FIGS. 8a, 8b, 8c, 9a, 9b, 9c, 10a, 10b, 10c, 11a, 11b, 11c, 12a, 12b, 12c, 13a, 13b, 13c, 14a, 14b, 14c, 15a, 15b, 15c, 16a, 16b, 16c, 17a, 17b and 17c illustrate a process for fabricating a passively aligned flexible optical circuit.
Figure 8B:
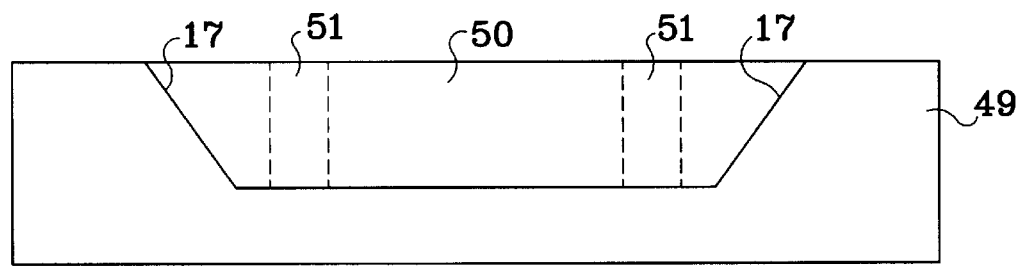
Figure 8C:
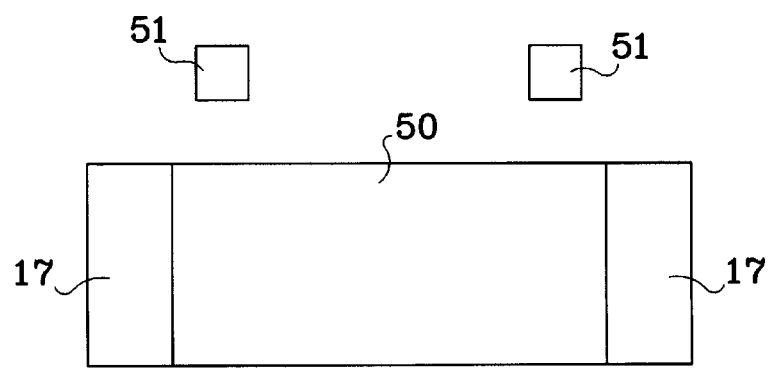

The following shows an example of fabrication of the subject invention. FIG. 8a shows a silicon die 49 for casting an ULTEM waveguide core 20 in trench-like space 50. Die 49 may be made of other materials, i.e., various metals rather than silicon. ULTEM is a General Electric (GE) plastic-like polyethuramide (sp) which is a liquid-type of substance used for injection molding. On each side of space 50 are smaller trenches 51. Trenches 51 create raised fudicial marks when injected with ULTEM. FIG. 8b is a side view which shows 45-degree folds, slants or cuts 17 in trench 50 for waveguide 20.

Figure 9A:
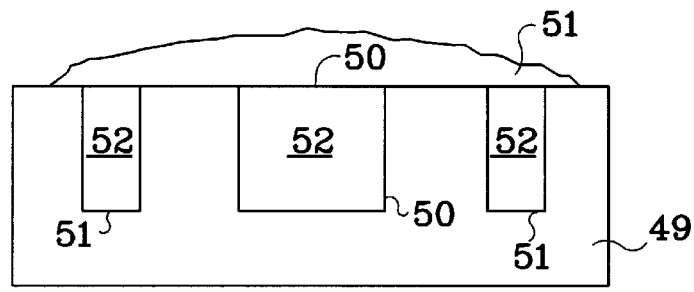
Figure 9B:
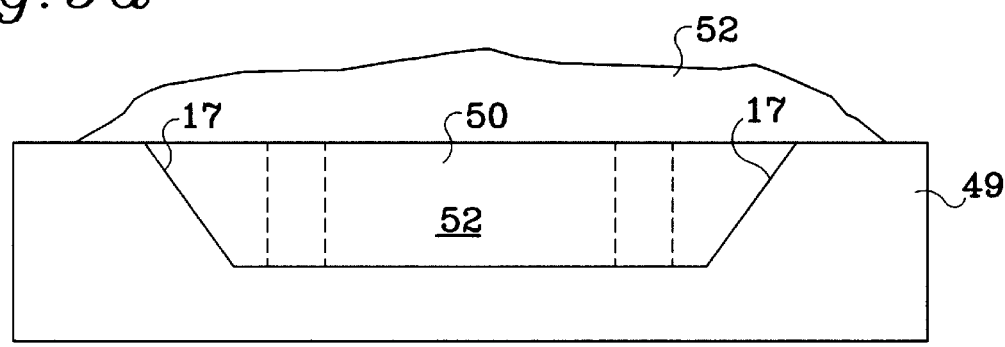
Figure 9C:
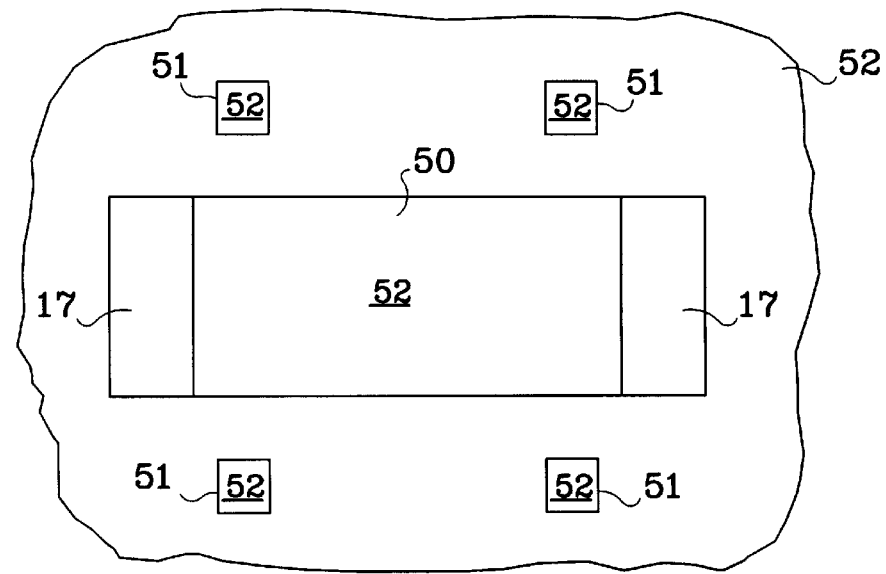
Figure 10A:
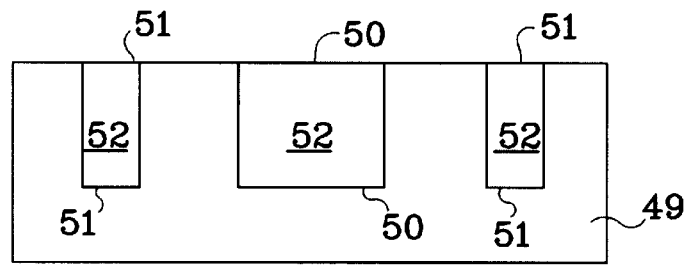
Figure 10B:
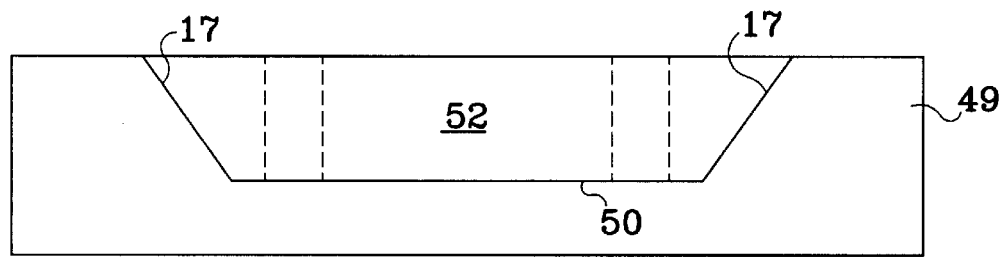
Figure 10C:
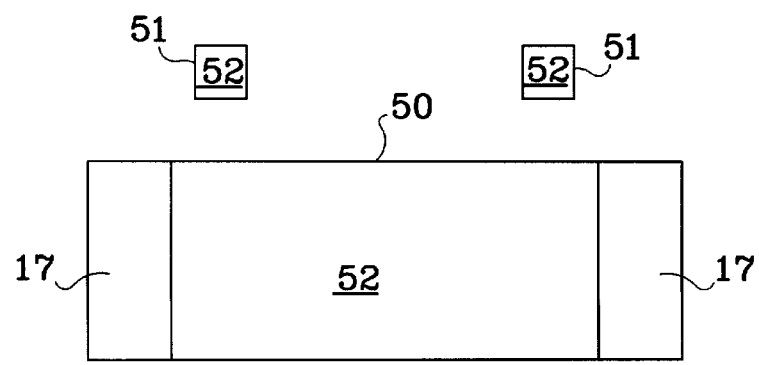
Figure 11A:
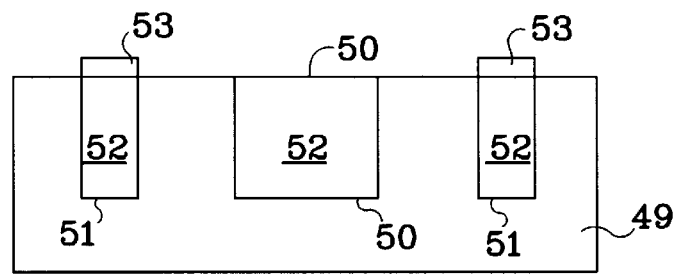
Figure 11B:
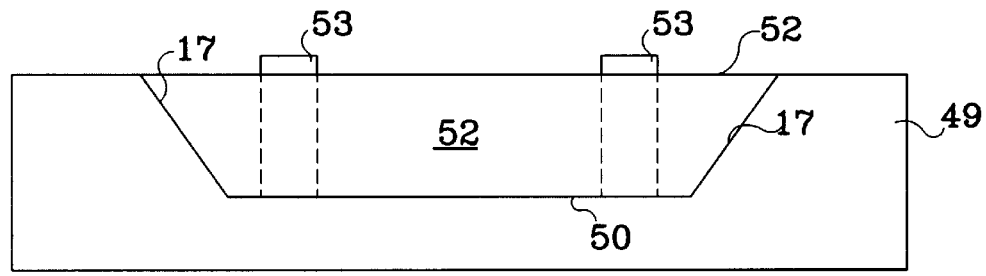
Figure 11C:
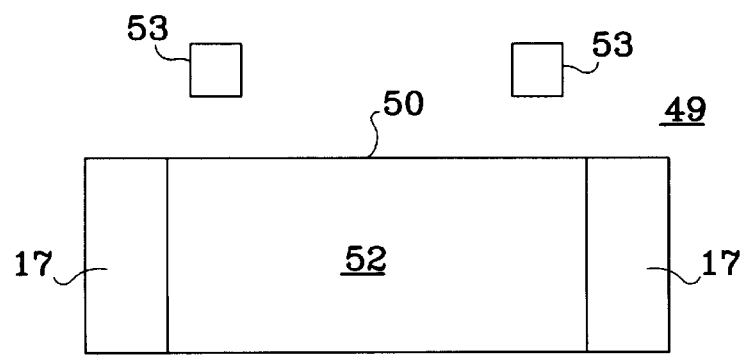

ULTEM material 52, or other equivalent material, is inserted into trenches 50 and 51, and overfilled as illustrated in FIGS. 9a, 9b and 9c. A "syringe" technique may be used for inserting material 52. Die 49 with material 52 applied is put in a chamber which is subjected to an environment of $N_2$ at a pressure between 0.05 and 0.1 atmosphere. ULTEM material 52 is cured at a temperature between 350 and 400 degrees Centigrade (C.). After the cure, the excess or footing of material 52 is removed with sandpaper, from coarse to fine. The removal of the excess material 52 may be instead removed with a diamond machine or metalinechloride (sp) vapor polishing. FIGS. 10a, 10b and 10c show the results after the removal of excess material 52 in that the new surface of material 52 in trenches 50 and 51 is even or matches up with the surfaces of die 49. A mask (not shown) is formed over die 49 and material 52 to form or deposit metal on material 52 in trenches 51 and the mask for masking fudicial marks for alignment purposes or a mechanical key. The mask is then removed with just metal 53 remaining on material 52 in trenches 51.

Figure 12A:
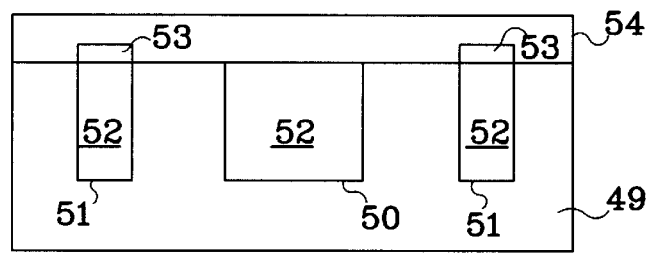
Figure 12B:
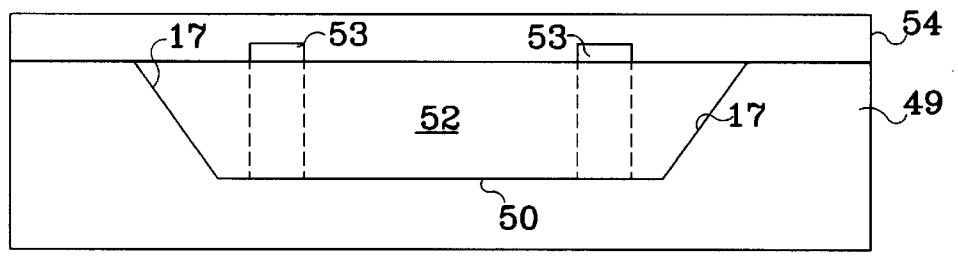
Figure 12C:
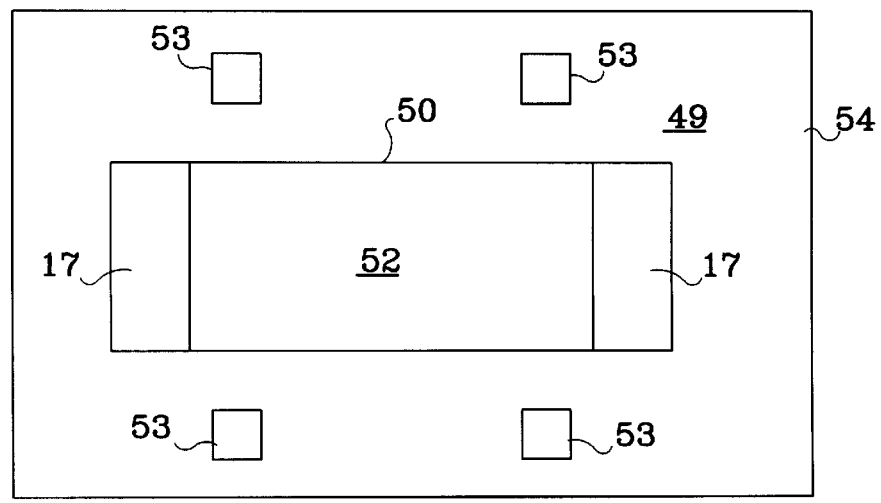
Figure 13A:
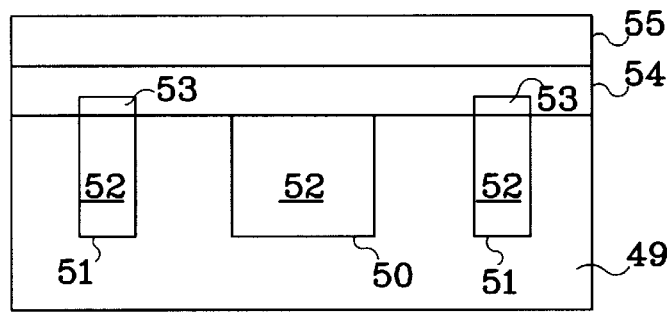
Figure 13B:
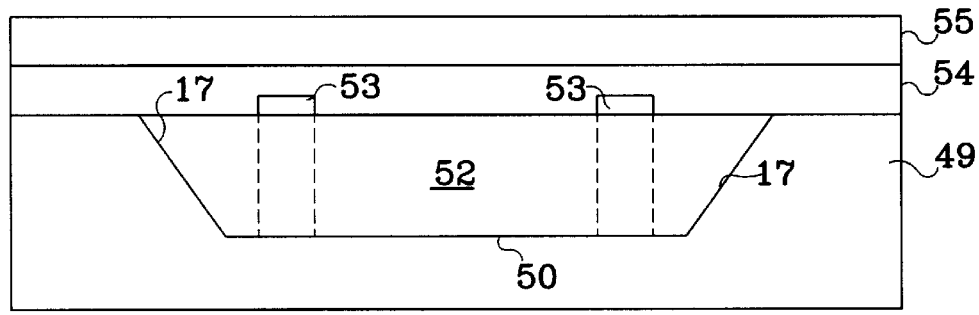
Figure 13C:
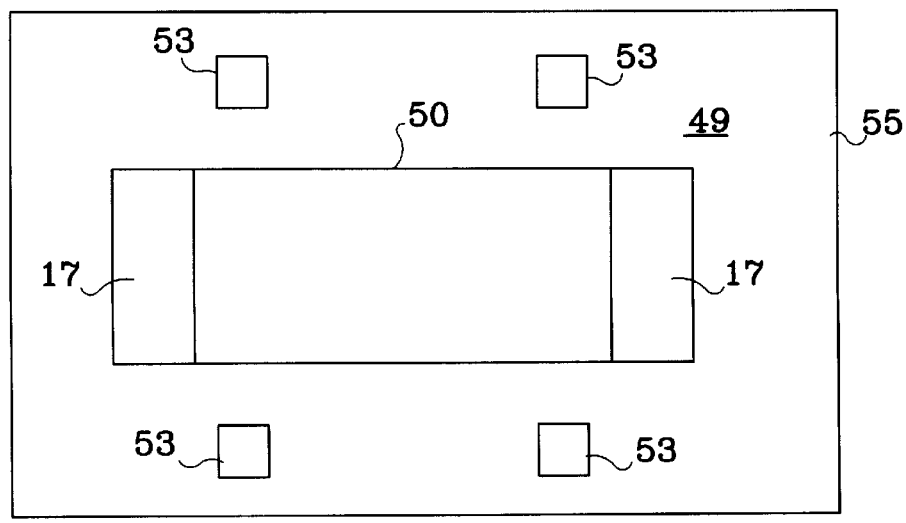

In FIGS. 12a, 12b and 12c, a cladding layer is formed on the "top" surfaces of die 49, on and about metal fudicial marks 53, and on top of ULTEM 52 of waveguide 20. Cladding layer 54 is a Dow Chemical Inc. BCB (benzocyclobutene (sp)) which is a commercial liquid product that is spun on and thermally cured. Cladding 54 has a lower index of refraction than waveguide 20 and is used to confine light transmission to waveguide 20. In FIGS. 13a, 13b and 13c, ULTEM layer 55 is formed on cladding layer 54. Layer 55 is a carrier or back layer for BCB layer 54. Layer 55 provides ruggedness and mechanical stability and is a handle. Layer 55 is cured at 210 degrees C.

Figure 14A:
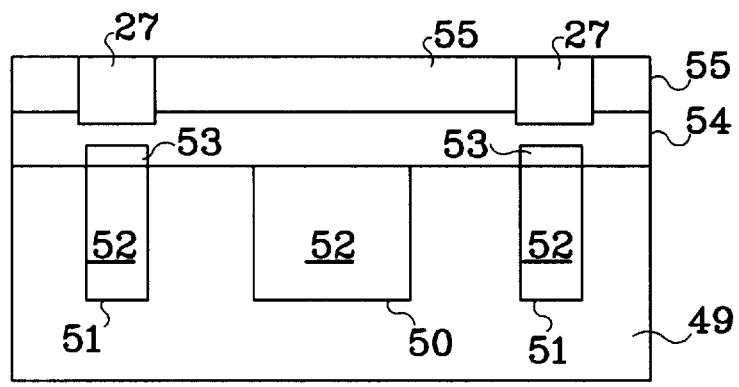
Figure 14B:
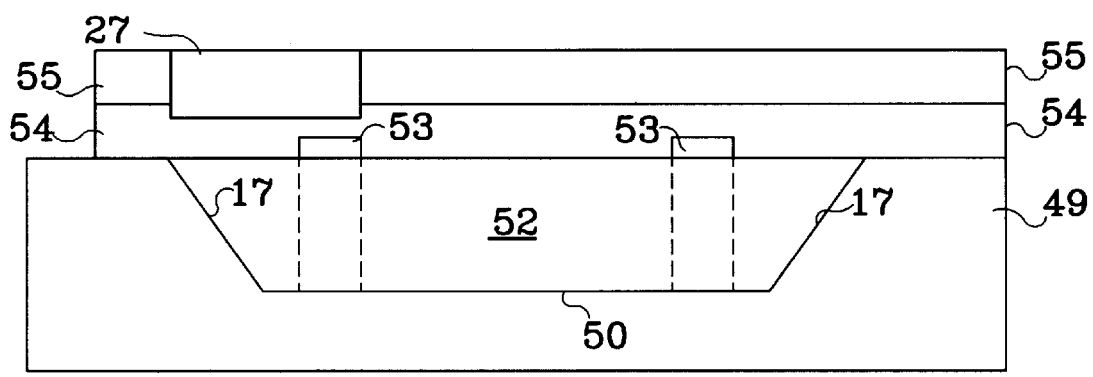
Figure 14C:
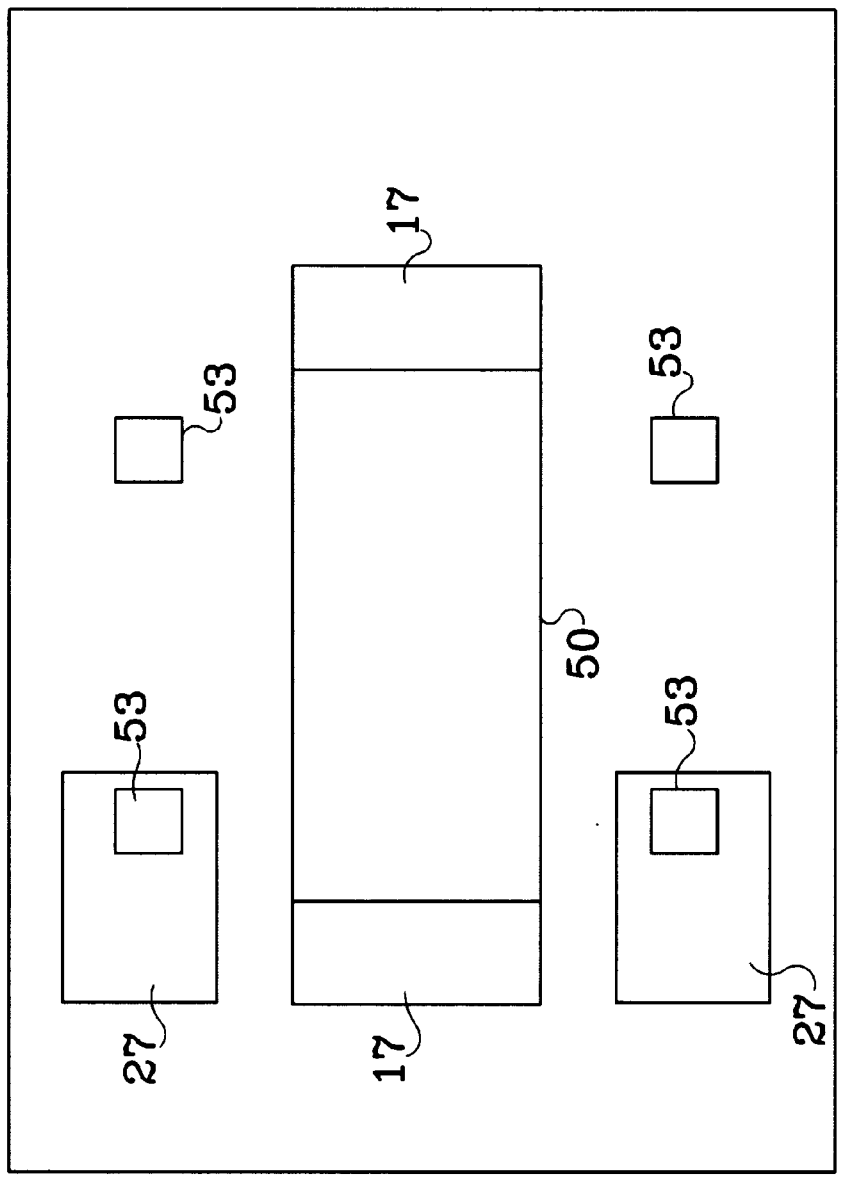

FIGS. 14a, 14b and 14c show the fabrication of alignment keys 27 with a RIA (reactive ion agent) etchant (SF6). Keys 27 are etched in ULTEM layer 55 and BCB layer 54. Key photoresist masks (not shown) are placed over layer 55 and are aligned according to metalized fudicial marks 53. Then keys 27 are formed via etching resulting in keys 27 aligned with marks 53.

Figure 15A:
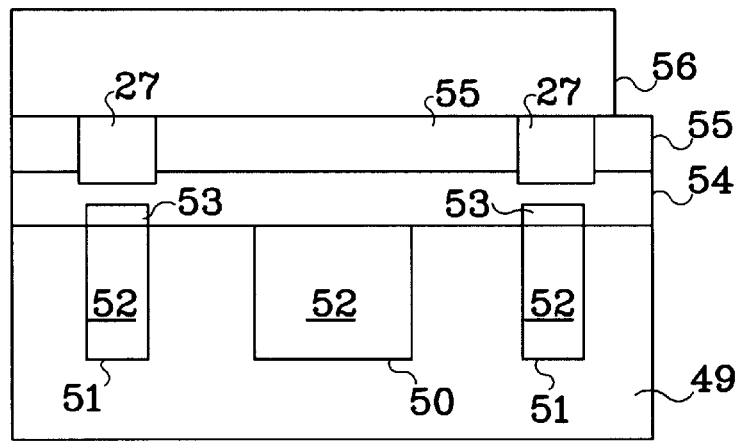
Figure 15B:
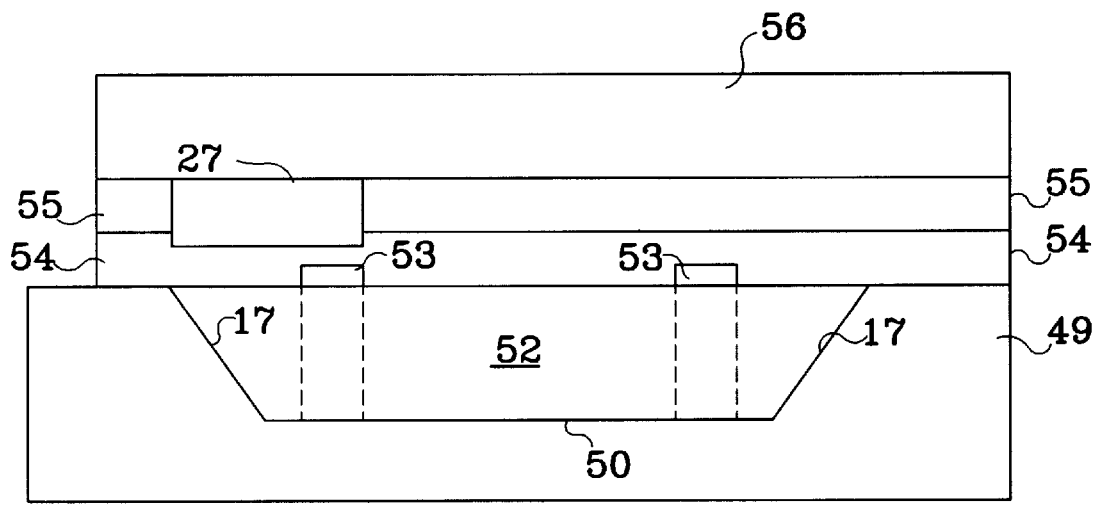
Figure 15C:
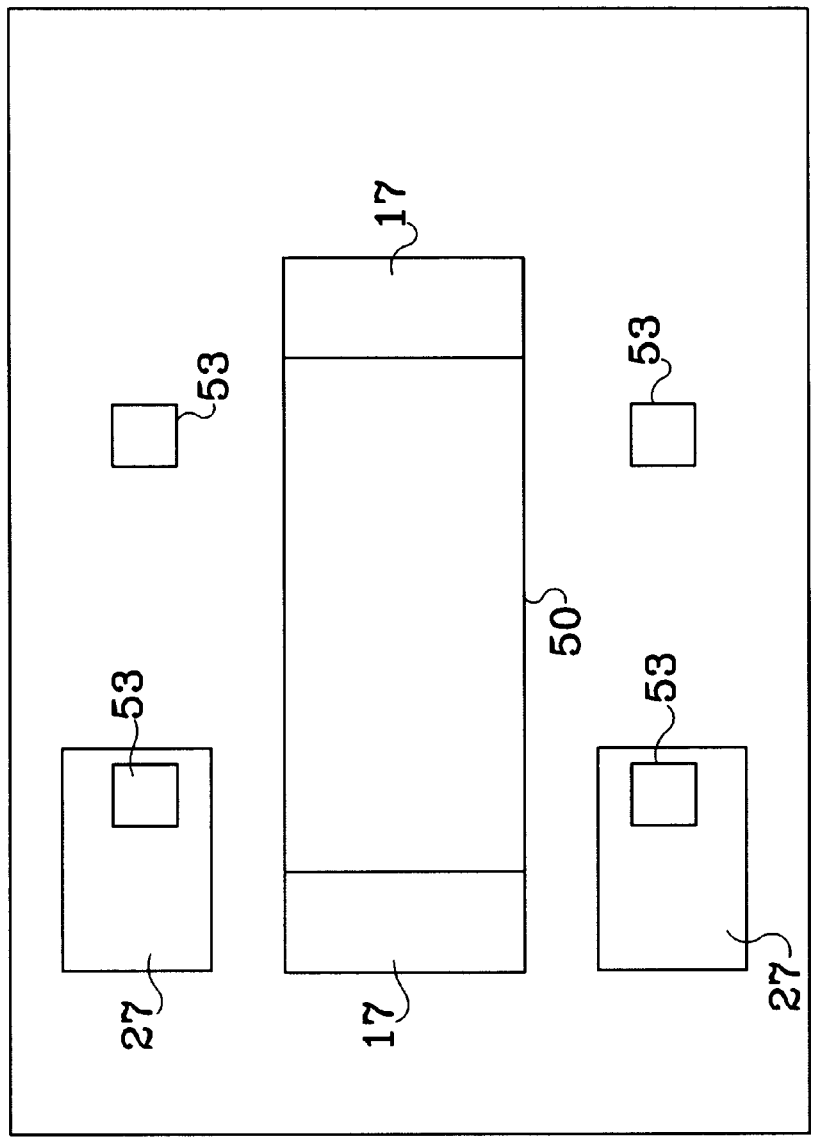
Figure 16A:
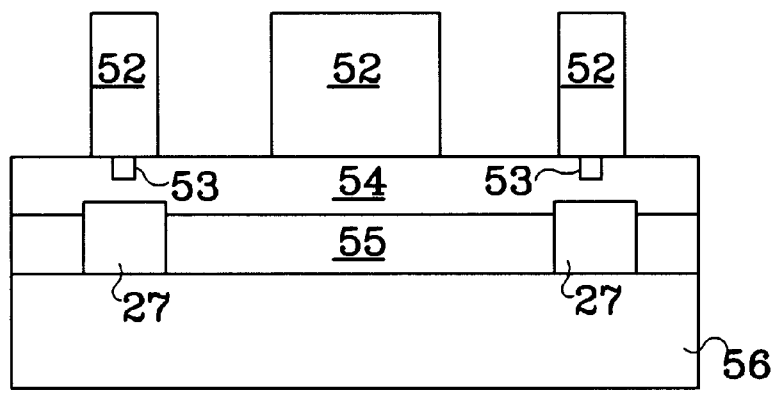
Figure 16B:
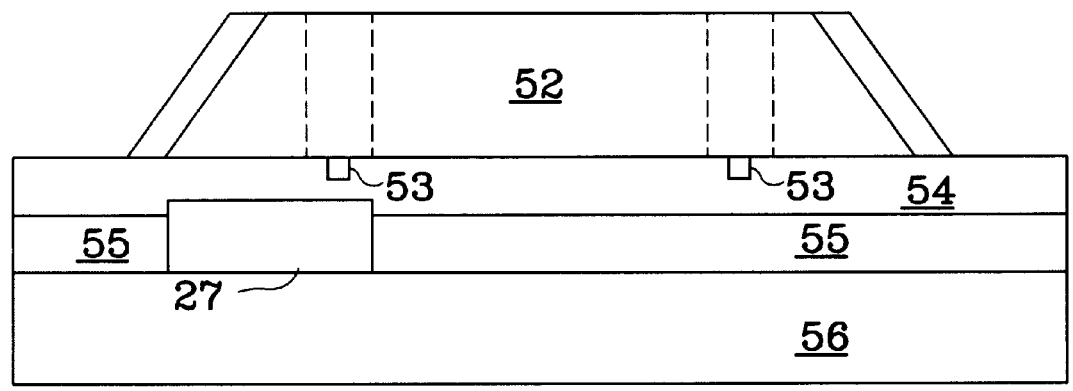
Figure 16C:
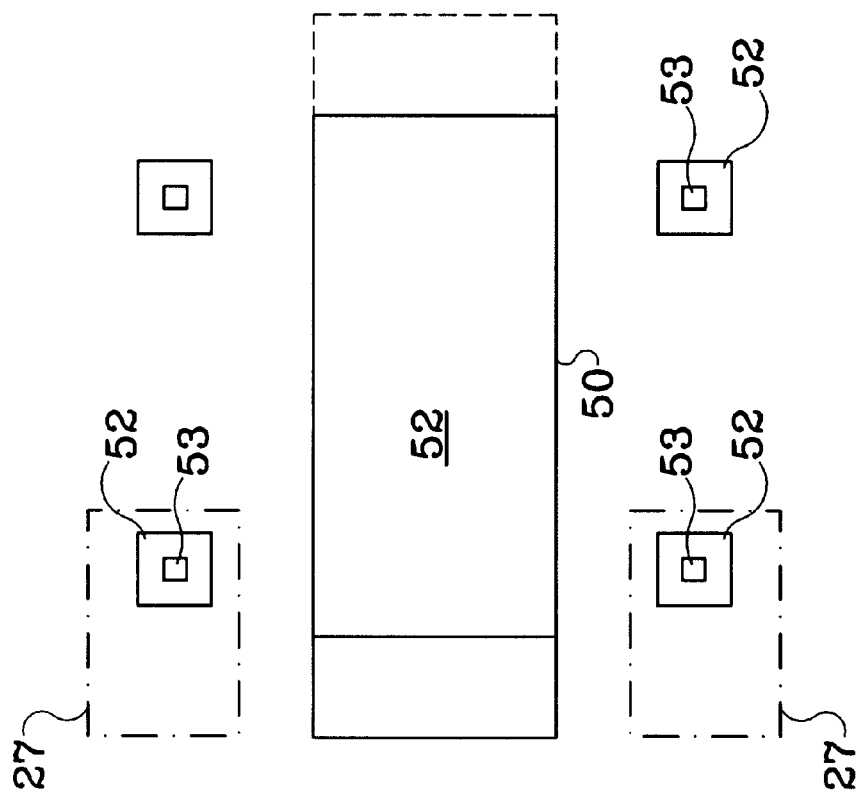

Quartz carrier 56 in FIGS. 15a, 15b and 15c, is put on ULTEM back or carrier layer 55 via an adhesion technique. Quartz carrier 56 is already fabricated and polished before it is attached to carrier 55. FIGS. 16a and 16b are effectively FIGS. 15a and 15b, flipped upside down, having silicon die 49 removed from ULTEM material 52 which formed waveguide 52 in trench 50 and material 52 formed by trenches 51 of die 49. The assembly of FIGS. 15a, 15b and 15c is put in a pressure cooker to effect the release of silicon master die 49 from the remaining assembly as shown in FIGS. 16a, 16b and 16c.

Figure 17A:
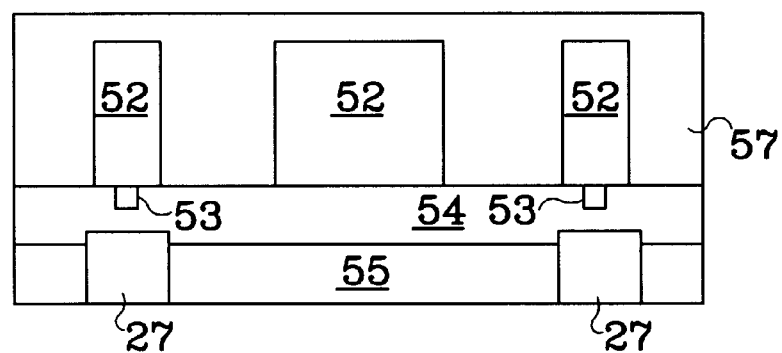
Figure 17B:
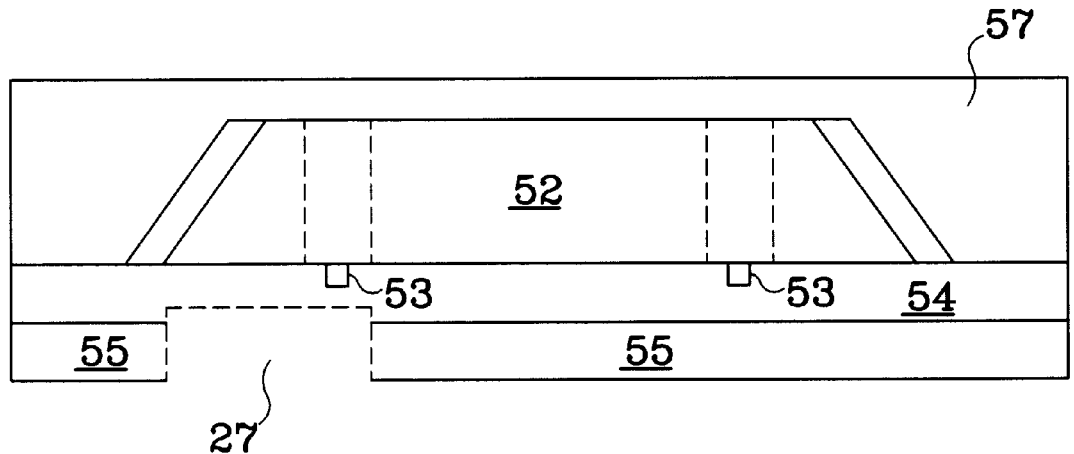
Figure 17C:
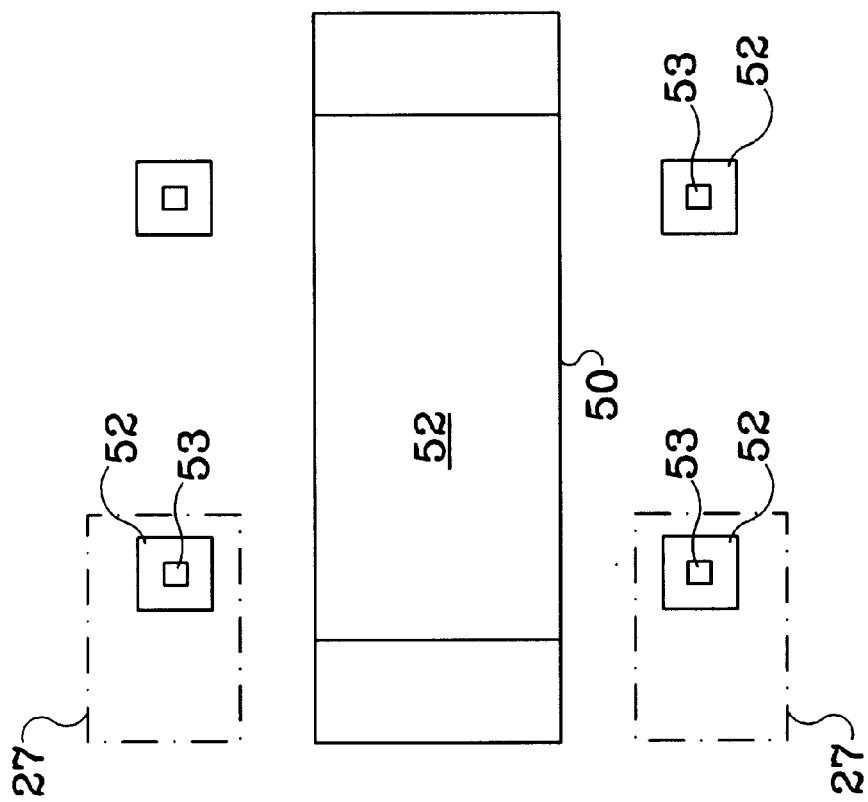

Metalized mirrors 18 are formed on portion of cuts or surfaces 17. A metal such as gold or aluminum is formed on cuts or surfaces 17 to result in metalized fold mirrors 18. A photoresist mask (not shown) is formed on the assembly of FIGS. 16a, 16b and 16c, such that only the areas of surfaces 17 to be used for mirrors 18 are exposed for the ensuing deposition of the metal. In FIGS. 17a, 17b and 17c, a final BCB cladding layer 57 is formed on ULTEM material 52, waveguide 20, mirrors 18 and ULTEM material 52. Then quartz carrier 56 is released and removed from ULTEM back layer 55. Thus, one has an example of a fabricated flex circuit 12.

We claim:

1. A self-aligned optical coupler system comprising:
    a first optical waveguide circuit having a first end and having at least one optical waveguide;
    a second optical waveguide circuit having a first end and having at least one optical waveguide;
    a first plug mechanism, having a first alignment structure, formed on the first end of the first optical waveguide circuit;
    a second plug mechanism, having a second alignment structure, formed on the first end of the second optical waveguide circuit;
    a receptacle mechanism, having a first end with a third alignment structure and a second end with a fourth alignment structure, and having at least one optical waveguide; and
    wherein:
    said first plug mechanism can be attached to the first end of said receptacle mechanism such that the first and third alignment structures mate in such a fashion so as to cause the at least one waveguides of the first plug mechanism and the receptacle mechanism to be aligned with each other at the first end of the receptacle mechanism; and
    said second plug mechanism can be attached to the second end of said receptacle mechanism such that the second and fourth alignment structures mate in such a fashion so as to cause the at least one waveguides of the second plug mechanism and the receptacle mechanism to be aligned with each other at the second end of the receptacle mechanism.

2. The self-aligned coupler system of claim 1, wherein:
    the alignment structures are visual alignment marks;
    the first and third visual alignment marks are visually aligned so as to cause the at least one waveguides of the first plug mechanism and the receptacle mechanism to be aligned with each other at the first end of the receptacle mechanism; and
    the second and fourth visual alignment marks are visually aligned so as to cause the at least one waveguides of the second plug mechanism and the receptacle mechanism to be aligned with each other at the second end of the receptacle mechanism.

3. The self-aligned coupler system of claim 2, wherein the visual alignment marks are visually aligned with machine vision techniques.

* * * * *